July 19, 1966 R. H. SCHUMAN 3,262,108

ANALOG TO DIGITAL CONVERTER

Filed June 13, 1961 4 Sheets-Sheet 1

INVENTOR.
RALPH H. SCHUMAN
BY
Williams, David, Hoffmann & Yount
ATTORNEYS

INVENTOR.
RALPH H SCHUMAN
BY
Williams, David, Hoffmann & Yount
ATTORNEYS

ANALOG TO DIGITAL CONVERTER

Filed June 13, 1961 4 Sheets-Sheet 3

INVENTOR.
RALPH H SCHUMAN
BY Williams, David, Hoffmann & Yount
ATTORNEYS

INVENTOR.
RALPH H. SCHUMAN
BY
Williams, David, Hoffmann & Yount
ATTORNEYS

3,262,108
ANALOG TO DIGITAL CONVERTER

Ralph H. Schuman, Cleveland, Ohio, assignor to The Warner & Swasey Company, Cleveland, Ohio, a corporation of Ohio Filed June 13, 1961, Ser. No. 116,764
23 Claims. (Cl. 340—347)

This invention relates to converter devices and in particular to devices for converting analogue quantities to digital quantities.

Analogue to digital converters have assumed a variety of forms and in one well known arrangement a coded information member is moved relative to code reading means in accordance with movement of a device the analogue of which is to be converted. The code is read as the member is moved so as to provide a plurality of binary values signals which constitute a multidigit number indicative of the position of the device.

Converters are widely employed in machine tools to indicate the angular position of a rotatable shaft such as a lead screw. The converter ordinarily includes an encoder disk rotatable according to rotation of the shaft and having a number of concentric zones of different radii each of which represents a separate digit in the multidigit number indicated by signals derived from the reading means. Each zone is comprised of alternate transparent and opaque portions representing two different values of the digit represented by the zone.

Adjacent each zone is a so-called reading line at which is positioned a radiant energy responsive unit such as a photocell for reading the zone. Light is applied to the cell through defining slits of a mask and the light is periodically blocked as the transparent and opaque portions pass the reading unit. At any given time the signal from a cell has one of two levels indicating a digit value and all the signals indicate a multidigit number of binary form representative of the shaft position.

Two codes are in common usage for such encoders and these are the Gray code or reflected binary code and the natural binary code. The reflected binary code possesses a distinct advantage in that only one digit of a given reflected binary number changes for a change to the next higher or next lower number from the given number. The reflected binary code is employed in the present invention.

When the reflected binary code is utilized it is desirable to provide means for converting the reflected binary numbers indicated by signals from the reading means to the equivalent natural binary numbers. This is for the reason that the reflected binary system is not well suited for mathematical operations, and such operations are more conveniently performed by devices responsive to signals representative of natural binary numbers.

According to the present invention a novel and improved decoding system is provided which is responsive to signals from reader units of an encoder inscribed with a reflected binary code. The decoder includes number converting means comprised of a plurality of similar circuits each responsive to the signal from a separate reader unit for converting reflected binary numbers indicated by signals from the reader units to the equivalent natural binary numbers. As is understood in the art a reflected binary number is converted to the equivalent natural binary number by successively comparing the reflected binary number digits with the natural binary number digits in the next higher digit places. If the compared digits are alike, then the equivalent natural binary number digit is a 0, and if the compared digits are different the equivalent natural binary number digit is a 1.

Each circuit of the number converting means is designed to effect the above-described digit conversion and includes a pair of input terminals to which are applied voltages representative respectively of a reflected binary number digit and a natural binary number digit in the next higher digit place. The input voltages have two levels indicative of the two values 0 and 1 of the represented digits, and the input voltages representative of the reflected binary digits and the natural binary digits are derived respectively from the reader units for the zones of the encoder and from the digit converting circuits. The natural binary number digit input terminal of the circuit associated with the coarsest zone of the encoder is connected so that a voltage is applied thereto indicative of a digit value 0.

Each digit converting circuit also includes a pair of output terminals at which appear voltages representative of the equivalent natural binary number digit. One of these output voltages is applied to either an output translating device, a digit comparing circuit or a digit adding circuit, depending on the location of the digit convertng circuit in the system. The other of the output voltages is applied to the natural binary number digit input terminal of the following digit converting circuit, and the natural binary number digit represented by such other output voltage is compared in the following circuit with the reflected binary number digit represented by voltage applied to the other input terminal of such following circuit. The circuits are designed so that voltages at the output terminals thereof have levels which, when assigned digit values, provide the number conversion.

In the described and illustrated embodiment the encoder is in the form of two encoder disks comprising a fine encoder disk rotatable with the shaft and a coarse encoder disk geared to the shaft so as to rotate through a fraction of a revolution for each revolution of the fine encoder. The coarse zone of the fine encoder has the same resolution as the fine zone of the coarse encoder and the digit indications of these two zones are caused to overlap by displacing the reading line for the coarse encoder from the reading line of the fine encoder by an amount corresponding to approximately one quarter revolution of the fine encoder. This arrangement permits compensation for reading errors which can result from gear backlash which may cause the two encoders to be out of synchronism so that the digits indicated thereby do not transfer at the same time. The arrangement is such that if the fine zone of the coarse encoder indicates a 1 when the coarse zone of the fine encoder indicates a 0, a 1 is added to the digit in the next to the lowest digit place of the equivalent natural binary number resulting from the coarse encoder and the digit in the lowest digit place is dropped to effect the compensation.

In the present invention the system also includes means for effecting the digit comparison and digit addition required to compensate for backlash. For this purpose a separate digit converting circuit is associated with each zone of the fine and coarse encoders, and the output voltages representative of natural binary number digits resulting from the digit converting circuits associated with the coarse zone of the fine encoder and the fine zone of the coarse encoder are applied to input terminals of a digit comparator circuit similar to the digit converting circuits. This circuit operates to produce an output voltage indicative of a 1 when the outputs from the digit converting circuits associated with the coarse zone of the fine encoder and the fine zone of the coarse encoder are indicative respectively of 0 and 1.

A plurality of digit adding circuits similar to the digit converting and digit comparator circuits are disposed to add a 1 to the digit in the next to the lowest digit place of the natural binary number indicated by the coarse encoder when the fine zone of the coarse encoder and the coarse zone of the fine encoder indicate 1 and 0 respectively. Each adding circuit includes a first output terminal at which appears a carry voltage which is applied to the following digit adding circuit together with a voltage representing a natural binary number digit derived from the digit converting circuit associated with the next coarser zone of the coarse encoder. The adding circuits also include second output terminals at which appear voltages representative of natural binary number digits resulting from the addition.

All of the digit converting circuits, the digit comparing circuit and the digit adding circuits are of the same basic design. In the preferred embodiment of the invention each circuit is transistorized and includes three output transistors to each of which is connected an output terminal.

Output voltages are derived from the output terminals and have different levels which indicate digit values. Each circuit also includes input terminals connected to an input transistor and to which are applied input voltages having levels indicative of digit values. The input and output transistors are interconnected by circuit means arranged so that the voltages at the output terminals have levels which, when assigned digit values, provide the correct mathematical operation for any application of the circuit in the system and with any combination of input voltage levels.

The reader means utilized in the system may take various forms and in the described and illustrated embodiment the reader means is comprised of a plurality of reader units each of the two cell, voltage responsive type described in application Serial No. 78,567, filed on Dec. 27, 1960, now Patent No. 3,218,626, by Ralph H. Schuman, and assigned to the assignee of the present invention. Such a reader unit includes a pair of light responsive units operatively connected to a voltage responsive circuit which produces an output quantity which is transferred between two extreme levels each time one of the light responsive units receives slightly more light than the other unit during rotation of the code disk. The output of such a reader unit requires a certain amount of disk rotation to transfer between its extreme levels and therefore, the curve representing such output includes sloped portions during transition periods wherein a division line between transparent and opaque portions of a zone of the disk is passing by a defining slit of the mask.

Due to the nature of the digit converting circuits the digit indicating levels of the voltages at the output terminals are attained at different values of the output voltage from the reader unit between its extreme values. Consequently, if a reading is taken during a transition period when the output voltage of a reading unit is varying between its extreme levels, erroneous information may result from the digit converting circuits.

In the present invention means are provided to eliminate the possibility of occurrence of such erroneous information and such means comprises a plurality of so-called decision elements each connected to be responsive to the output of a separate reader unit. Each decision element produces an output quantity which varies between two stable states substantially instantaneously when the input thereto increases and decreases to preselected values. The output of each decision element is applied to a separate digit converting circuit and operates to cause the output voltages of the associated digit converting circuit to attain their digit indicating levels simultaneously when the output of the reader unit increases and decreases to selected levels.

It is therefore an object of the invention to provide a converter device including an encoder and novel and improved means for converting a number in one code derived from the encoder to the equivalent number in another code.

It is another object of the invention to provide a converter device including an encoder and novel and improved means for converting a number in the reflected binary code derived from the encoder to the equivalent number in the natural binary code.

It is a further object of the invention to provide a converter device including an information member inscribed with the reflected binary code and movable with respect to code reader means, and a decoding system including a plurality of interconnected circuits associated with the reader means for converting the reflected binary number indicated by the reader means to the equivalent natural binary number.

It is still another object of the invention to provide a converter device including fine and coarse code disks inscribed with the reflected binary code and geared for rotation at different speeds with a plurality of code reader units and a novel and improved decoding system for converting a reflected binary number indicated by the reader units to the equivalent natural binary number and for altering the natural binary number derived from the coarse disk to compensate for errors resulting from gear backlash.

It is a still further object of the invention to provide a device as defined in the preceding object wherein the decoding system includes a plurality of circuits of similar design composed of digit converting circuits associated with the reader units, a digit comparing circuit for comparing natural binary number digits resulting from the coarse zone of the fine disk and the fine zone of the coarse disk, and digit adding circuits associated with the digit comparing circuit and with the digit converting circuits for the coarse disk.

It is another object of the invention to provide a circuit capable of performing either a digit converting, a digit comparing or a digit adding operation in a decoding system of an analogue to digital converter.

Other objects of the invention will become apparent from the following description taken in conjunction with the accompanying drawings in which.

While the present invention is susceptible of various modifications and constructions, it is particularly applicable to a converter device wherein a fine encoder disk and a coarse encoder disk are geared for rotation at different speeds in accordance with rotation of a shaft, and wherein the disks have codes inscribed thereon in reflected binary form which are read by reader units which produce output voltages having levels indicative of values of digits represented by zones of the disks.

Figure 1:
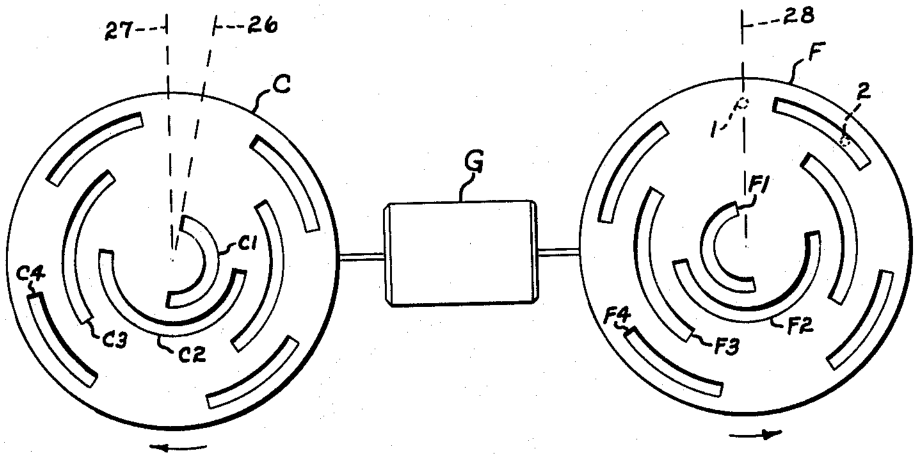
FIG. 1 is a schematic representation of a two speed code disk arrangement forming part of an analogue to digital converter.

Referring now to the drawings there is shown in FIG. 1 a portion of an analogue to digital converter device including coded information means movable according to movement of a device, such as a shaft, the analogue of which is to be converted. The information means is shown in the form of a pair of code disks F and C. The disk F may be termed a fine disk and is generally secured to the shaft, the analogue of which is to be converted, so that the fine disk rotates with the shaft. The disk C may be termed a coarse disk and is operatively connected to the disk F so as to rotate through a fraction of a revolution for each revolution of the disk F. The connection may be made by suitable gearing shown in diagrammatic form and designated by the reference character G.

The disk F includes a plurality of concentric digit representing zones and in FIG. 1 four such zones are illustrated designated by the reference characters F1, F2, F3 and F4. In a similar manner the disk C includes four concentric digit zones C1, C2, C3 and C4. Each zone of each disk includes alternate transparent and opaque portions which respectively permit and prevent the passage of light from a source (not shown) to light responsive code reader units described hereinafter. The transparent and opaque portions are arranged in the reflected binary code and the gearing G is designed so that the coarse zone F1 of the disk F and the fine zone C4 of the disk C have the same resolution. Although each disk is shown as providing a four digit number, it is understood that a greater or lesser number of digits may be provided as desired.

Figure 2:
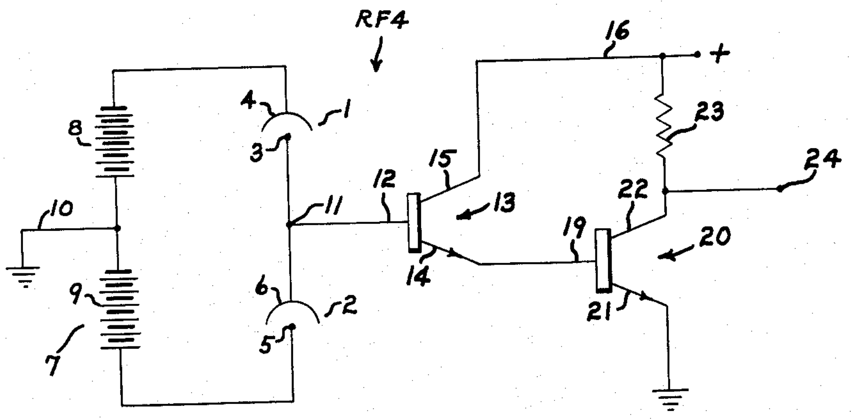
FIG. 2 is a circuit diagram of a reader unit employed in the converter.
Figure 3:
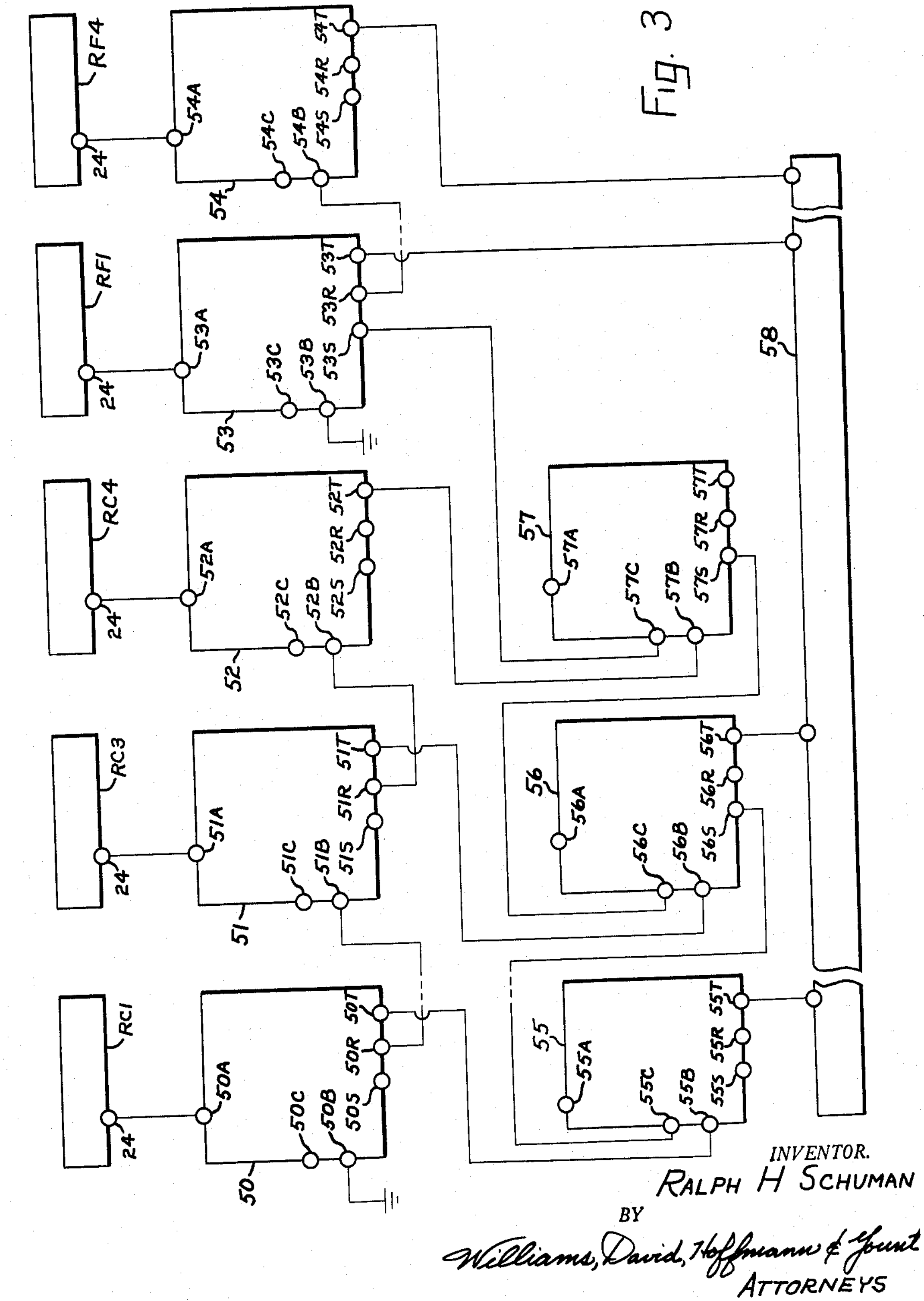
FIG. 3 is a block diagram of the decoding system employed in the converter.

In order to read the codes inscribed on the code disks there is provided a plurality of reader units diagrammatically represented in FIG. 3 by the blocks RC1, RC3 and RC4 associated with the zones C1, C3 and C4 of the code disk C, and by the blocks RF1 and RF4 associated with the zones F1 and F4 of the disk F. Not all of the reader units are shown in FIG. 3, the reader unit for the zone C2 of the disk C and the reader units for the zones F2 and F3 of the disk F being omitted. The reader units may be of any conventional type such as a plurality of photocells arranged in a reading line with a separate cell opposite each of the zones. However, in the described and illustrated embodiment, each reader unit is of the two cell, voltage responsive type shown and described in the aforementioned Schuman application. Details of such a reader unit are shown in FIG. 2.

The reader unit RF4 is illustrated in FIG. 2 and includes a pair of light responsive devices shown in the form of photocells 1 and 2 of the current generating type. The cell 1 includes an anode 3 and a cathode 4 and the cell 2 similarly includes an anode 5 and a cathode 6. The cells 1 and 2 are connected across a direct voltage source 7 having two sections 8 and 9 and a grounded center tap connection 10 is provided between the sections 8 and 9. The anode 5 of the cell 2 is connected to the lower positive terminal of the section 9 and the cathode 4 of the cell 1 is connected to the upper negative terminal of the section 8.

The cells 1 and 2 are disposed relative to the associated zone in spaced relation along the zone so that as division lines between adjacent transparent and opaque portions are moving by the two cells, one cell is going dark at the same time that the other cell is going light, and the arrangement is such that the currents resulting from the cells vary in opposie directions substantially simultaneously. In FIG. 1 the cells 1 and 2 are shown in association with the zone F4 of the fine disk F.

The anodes 3 of cell 1 is connected to the cathode 6 of cell 2 and with the described arrangement it is observed that voltage at a pooint 11 between the cells is rapidly transferred between two levels each time one cell receives slightly more light than the other cell. The voltage has a generally rectangular wave form but the change between the two voltage levels is not instantaneous and therefore a certain amount of rotation of the disk is required to effect the change.

The voltage at the point 11 is applied to a voltage responsive circuit which produces an output voltage variable according to voltage at the point 11. As shown in FIG. 2, the point 11 is connected to the base 12 of a transistor 13 including also an emitter 14 and a collector 15. The transistor 13 is connected as an emitter follower and the collector 15 is connected to a conductor 16 which has applied thereto a positive voltage.

The emitter 14 of transistor 13 is connected to the base 19 of a transistor 20 having also an emitter 21 and a collector 22. The emitter 21 is connected to ground and the collector 22 is connected to the conductor 16 through a resistor 23. An output terminal 24 is connected to the collector 22 and an output voltage appears at the terminal 24 which varies in accordance with the voltage at the point 11. Although the transistors 13 and 20 are shown in the form of NPN transistors, transistors of the PNP type may be utilized if desired.

As previously stated, errors in the digital output can occur when the transitions of digit values of the two disks are not synchronized as a result of gear backlash. As an example, when the digit value indicated by the zone F1 of disk F changes, the digit value indicated by the zone C4 of disk C should also change at the same time. If the simultaneous change does not occur, the coarse disk C will indicate a number of revolutions of the fine disk F which may be more or less than the actual number of revolutions of the fine disk. Compensation is provided by displacing the reading line 26 of the disk C from the vertical index line 27 by an angular distance which corresponds to one quarter revolution of the disk F. The two disks are shown in their zero number indicating positions and the vertical line 28 represents the reading line of the disk F. The arrangement is such that the disk C indicates numbers which represent half revolutions of the disk F.

In order to effect the compensation a 1 is added to the natural binary number digit resulting from the zone C3 of the disk C if the natural binary number digits resulting from the zones C4 and F1 have values respectively 1 and 0.

The decoding means of the present invention includes means for converting the reflected binary number digits represented by output voltages produced by the reading units for the zones of the coarse and fine encoders to the equivalent natural binary number digits. For this purpose a plurality of digit converting circuits are disposed each for energization in accordance with the voltage output of a separate reader unit. The decoding means also includes means for effecting operations required to compensate for gear backlash, and to this end a digit comparing circuit and a plurality of digit adding circuits all similar to the digit converting circuits are utilized.

In FIGURE 3, a plurality of digit converting circuits are diagrammatically represented by blocks 50, 51, 52, 53 and 54, the circuits 50, 51 and 52 being associated with the coarse disk C and the circuits 53 and 54 being associated with the fine disk F. The number of circuits utilized depends upon the number of digit zones employed and if, for example, the coarse disk C includes four zones as shown in FIG. 1, then four digit converting circuits are utilized with the coarse disk. In FIGURE 3 the circuits 50, 51 and 52 are shown associated respectively with the reader units RC1, RC3 and RC4 for the zones C1, C3 and C4 of the coarse encoder representative of digits in the fourth, third and first digit places of the reflected binary number. Similarly, the circuits 53 and 54 are associated respectively with the reader units RF1 and RF4 for the zones F1 and F4 of the fine encoder representative of digits in the fourth and first digit places of the reflected binary number. The digit converting circuits associated with the reading units for the remaining zones are not shown.

As is understood in the art, a reflected binary number is converted to the equivalent natural binary number by successively comparing each digit of the reflected binary number with each digit of the natural binary number in the next higher digit place. If the compared digits are alike, the equivalent digit of the natural binary number is a 0 and if the compared digits are different the equivalent digit of the natural binary number is a 1. For example, the reflected binary number 0110 corresponds to the decimal number 4, and to provide the equivalent natural binary number, which is 0100, the digit 0 in the fourth digit place of the reflected binary number is initially compared with the digit 0 in the fifth digit place of the natural binary number. Since these digits are alike, the digit in the fourth digit place of the natural binary number is 0. This digit and the digit 1 in the third digit place of the reflected binary number are then compared, and since these digits are different, the digit in the third digit place of the natural binary number is 1. This procedure is then continued and the natural binary number 0100 will result.

Each of the circuits 50–54 operates to effect the digit conversion above described and in addition, circuits diagrammatically represented by blocks 55, 56 and 57, which are similar to the circuits 50–54, are employed to effect compensation for errors in reading which may arise from gear backlash.

In order to effect the compensation the circuit 57 operates to compare the natural binary number digit indicated by the output voltage of the reader unit RF1 for the coarsest zone F1 of the fine encoder F and the natural binary number digit indicated by the output voltage of the reader unit RC4 for the finest zone C4 of the coarse encoder C. If the finest zone C4 of the coarse encoder indicates a 1 when the coarsest zone F1 of the fine encoder indicates a 0, the circuit 57 operates to produce an output voltage having a level representative of a 1 which is added by the circuit 56 to the natural binary digit represented by the output of the circuit 51 associated with the reader unit RC3 for the zone C3 of the coarse encoder next to the finest zone which, in the illustrated embodiment, represents the digit in the second digit place. The circuit 55 operates to add a carry derived from the preceding circuit, if a carry is present, to the natural binary number digit represented by the output of the circuit 50 associated with the reader unit RC1 for the coarsest zone C1 of the coarse encoder.

Each of the circuits shown in FIGURE 3 includes a number of input and output terminals. The input terminals of these circuits are represented by the same reference numeral employed to designate the associated circuit with the suffixes A, B and C added respectively. In a like manner, the output terminals of the circuits are represented by the same reference numeral employed for the circuits with the suffixes R, S and T added respectively. The input terminals 50A–54A have applied thereto output voltages from the reader units for the zones of the two disks, and these output voltages represent reflected binary digits 0 or 1 depending upon the level of the output voltage. The input terminals 50B–54B have applied thereto voltages which represent natural binary number digits in the next higher digit places than the digit places of the reflected binary number digits represented by voltages applied to the terminals 50A–54A. The terminals 50C–54C are not utilized in the system shown in FIG. 3, but as will presently appear these terminals may be employed in place of the terminals 50A–54A.

The output terminals 50T–54T and the output terminals 50R–54R have voltages thereon which are indicative of the natural binary number digits resulting from the digit conversion. The voltages at the terminals 50R and 51R are applied to the B terminals of the following circuits associated with the next finer zones and this arrangement permits a comparison of the reflected binary number digits with the natural binary number digits in the next higher digit place. In a similar manner, the voltage at the terminal 53R is applied to the B terminal of the digit converting circuit (not shown) associated with the next finer zone F2 of the fine disk. The voltage at the R terminal of the circuit (not shown) associated with the next to the finest zone F3 of the fine disk is applied to the input terminal 54B.

It is noted that the terminals 50B and 53B of the circuits associated with the coarsest zones C1 and F1 are connected to ground. With such arrangement a voltage is applied to each of these terminals indicative of natural binary number digits 0 which are the natural binary number digits in the digit places which are next higher than the fourth digit places containing the reflected binary number digits represented by voltages applied to the terminals 50A and 53A.

The terminal 53S produces an output voltage indicative of a natural binary number digit which is the same value as the natural binary number digit represented by voltage at the terminal 53T. The voltage at the terminal 53S is applied to the input terminal 57C of the digit comparator circuit 57. The S terminals of the circuits 50, 51, 52 and 54 are not utilized in the system shown in FIGURE 3. The voltages at the output terminals 53T and 54T are applied to input terminals of a suitable translating device 58 which may comprise magnetic storage elements, etc.

The voltage at the terminal 52T is applied to the terminal 57B of the digit comparator circuit 57 and this circuit operates to compare the natural binary number digits resulting from the circuits 52 and 53 associated respectively with the finest zone C4 of the coarse disk and the coarsest zone F1 of the fine disk. The circuit 57 operates to produce a voltage at the terminal 57S which has a level indicative of a (1) to be added to circuit 56 when the voltages at the terminals 52T and 53S are indicative respectively of digit values 1 and 0.

The output voltages at the terminals 57S and 51T are applied respectively to the terminals 56C and 56B of the circuit 56 which operates to add the digits represented by the input voltages thereto. The voltage at the terminal 56T is indicative of a natural binary number digit which is the sum of the natural binary number digits indicated by the input voltages of the circuit 56 and the voltage at the terminal 56T is applied to the translating device 58.

A voltage appears at the terminal 56S having a level indicative of a 1 or a carry, or a 0 or no carry, dependent upon the values of the digits added by the circuit 56. The carry voltage at the terminal 56S is applied to the following circuit (not shown) having a B input terminal to which is applied voltage from the T output terminal of the circuit (not shown) associated with the zone C2 of the coarse disk representative of the digit in the third digit place. Finally, the carry voltage from the circuit (not shown) which adds a carry from the preceding circuit 56 and a natural binary number digit from the circuit (not shown) associated with the zone C2 of the coarse encoder representative of the digit in the third digit place is applied to the terminal 55C of the circuit 55. The natural binary number digit represented by voltage at the terminal 50T of the circuit 50 is applied to the terminal 55B and this digit and the carry digit are added and the resultant natural binary number digit is indicated by voltage at the terminal 55T which is applied to the translating device 58.

The upper and lower levels of the voltages at the terminals of each circuit represent the two values of a digit. In certain of the circuits 50–57 the upper voltage levels indicate a digit value 1 and the lower voltage levels indicate a digit value 0. In others of such circuits the upper voltage levels represent a digit value 0 and the lower voltage levels represent a digit value 1. The manner of assigning digit values to the voltage levels will be described in more detail hereinafter.

Figure 4:
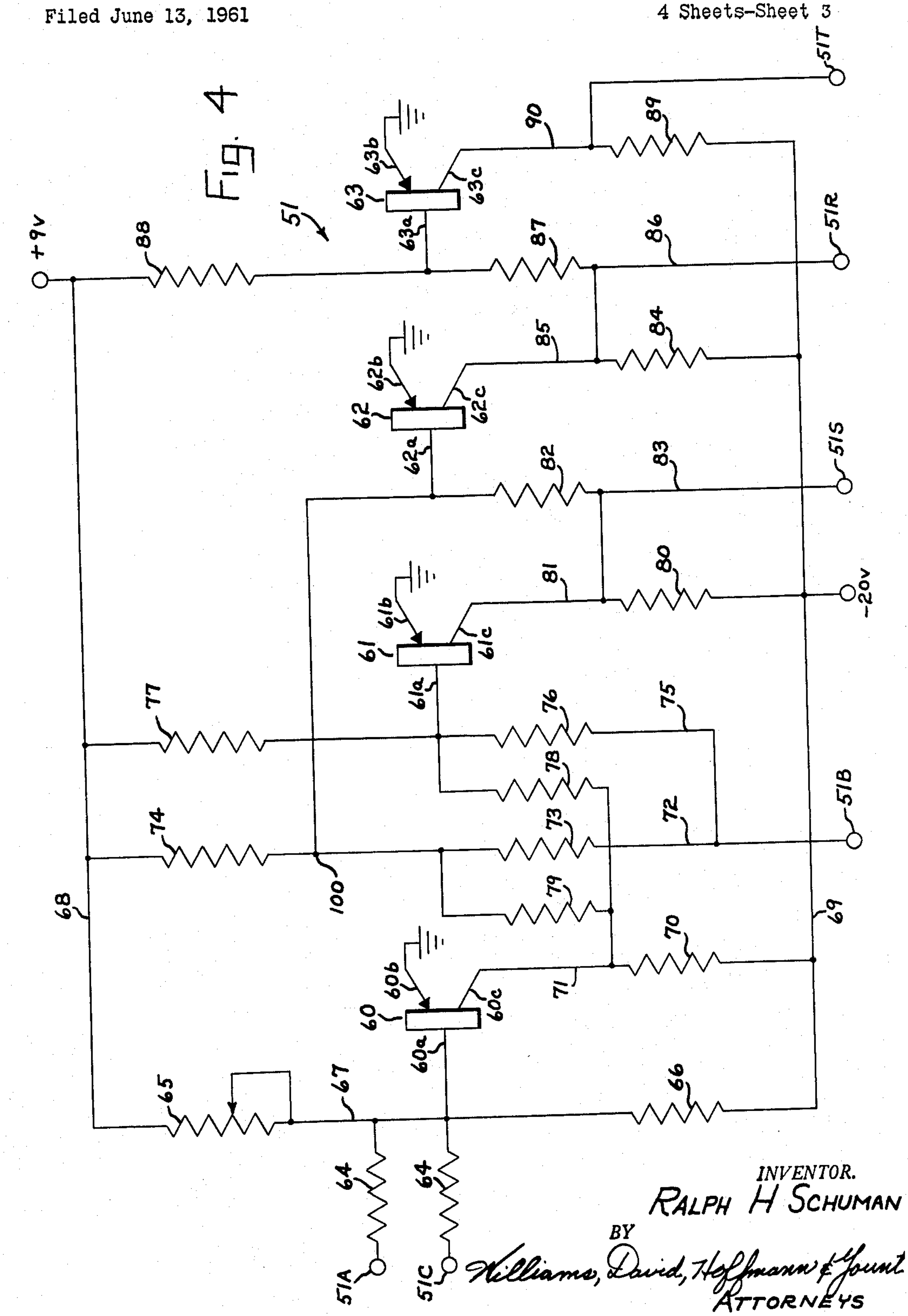
FIG. 4 is a circuit diagram of one of the blocks of FIG. 3.

Details of one of the circuits 50–57 may now be described. FIGURE 4 illustrates in detail one of the circuits 50–57 and for purposes of description the circuit 51 is shown in FIGURE 4. The circuit 51 includes a plurality of electroresponsive valve devices shown in the form of transistors 60, 61, 62 and 63 of the PNP type and the transistors 60–63 may be of the NPN type if desired. Each of these transistors has base, emitter and collector electrodes and these electrodes are represented by the same reference numeral employed to designate the associated transistor with the suffixes *a*, *b* and *c* added thereto respectively and the emitters of the transistors are connected to ground or a zero reference potential.

The input terminals 51A and 51C are connected through respective resistors 64 to the base 60*a* of transistor 60 and a point intermediate a pair of resistors 65 and 66 included in a conductor 67 connected to conductors 68 and 69 which have applied thereto positive and negative voltages respectively.

The collector 60c of transistor 60 is connected to a resistor 70 included in a conductor 71 connected to the conductor 69. The input terminal 51B is connected to a conductor 72 including resistors 73 and 74, with the upper terminal of the resistor 74 being connected to the conductor 68. A conductor 75 is connected to the conductor 72 at the lower terminal of the resistor 73 and includes a resistor 76 connected to the base 61a of the transistor 61 and a resistor 77, the upper terminal of which is connected to the conductor 68. A resistor 78 is connected between the base 61a and the upper terminal of the resistor 70, and a resistor 79 is connected between the upper terminal of the resistor 70 and the upper terminal of the resistor 73.

A resistor 80 is included in a conductor 81 which is connected to the conductor 69 and to the collector 61c of the transistor 61. A resistor 82 is included in a conductor 83 which is connected to the output terminal 51S and the lower terminal of the resistor 82 is connected to the upper terminal of the resistor 80. The upper terminal of the resistor 82 is connected to the base 62a of the transistor 62 and to the lower terminal of the resistor 74. A resistor 84 is included in a conductor 85 connected to the conductor 69 and to the collector 62c of the transistor 62. The terminal 51R is connected to a conductor 86 including a resistor 87 having its upper terminal connected to the base 63a of the transistor 63 and to the lower terminal of resistor 88 which has its upper terminal connected to the conductor 68. The lower terminal of the resistor 87 is connected to the upper terminal of the resistor 84. A resistor 89 is included in a conductor 90 connected to the conductor 69 and to the collector 63c of transistor 63. The terminal 51T is connected to the upper terminal of the resistor 89.

Bivalued voltage signals are applied to or appear at the terminals of the circuit 51 and the upper and lower levels of these voltages may be assigned to represent different values of a digit, and for purposes of description it will be assumed that the upper levels of the voltages at the terminals 51A and 51T represent digit values 1 and that the lower levels of the voltages at these terminals represent digit values 0. The upper levels of the voltages at the terminals 51B, 51R and 51S are assumed to represent digit values of 0 and the lower levels of voltages applied to these terminals are assumed to represent digit values 1.

Each voltage applied to the input terminals 51A and 51B has two digit indicating levels. As a result, four combinations of voltage levels are possible, and at any given time one combination of voltage levels is applied to the input terminals. The transistors 60 and 61 with their circuit connections constitute first circuit means connected for energization in accordance with voltages at the input terminals 51A and 51B to produce a first output voltage at terminal 51S having upper and lower levels determined by the combination of the input voltage levels. The transistors 62 and 63 with their circuit connections constitute second circuit means connected for energization in accordance with the input voltages and the first output voltage to produce a second output voltage at the terminal 51R or 51T.

When the digit values applied to the terminals 51B and 51A are different, i.e. the voltage levels are both at their upper or lower levels, the output voltage at the terminal 51T has a level indicative of a digit value 1, as previously explained, to provide the conversion. When the digit values represented by the levels of the voltages applied to the terminals 51B and 51A are alike, the output voltage at the terminal 51T has a level indicative of a digit value 0. To describe the operation of the circuit let it be assumed initially that the digit values indicated by the levels of voltages applied to the terminals 51B and 51A are both 1 and with this assumption the voltages at the terminals 51B and 51A are respectively at their lower and upper levels.

When the voltages applied to the terminals 51A and 51B are respectively at their upper and lower levels so as to indicate digit values 1, the transistor 60 is in a nonconducting condition due to the voltage at terminal 51A and the collector 60c is therefore at a negative voltage. This negative voltage and the negative voltage at terminal 51B act through the resistors 76 and 78 to place the transistor 61 in a conducting condition. As a result the collector 61c of the transistor 61 is at its upper voltage level whereby the voltage of the lower end of resistor 82 is raised and terminal 51S is also at its upper voltage level.

The raising of the voltage of the lower end of resistor 82 does not render the transistor 62 nonconductive since the point 100 in the circuit is at a negative voltage at this time due to the negative voltages at the terminal 51B and at the collector 60c. The negative voltage at point 100 lowers the base voltage of transistor 62 to render it conductive so that the voltage at the collector 62c is at its upper level whereby the voltage at the terminal 51R is also at its upper level. The upper level of the voltage of collector 62c, acts through the resistor 87 to render the transistor 63 nonconductive so that the voltage at the terminal 51T is therefore at its lower level. It is thus seen that the voltages at terminals 51S and 51R are at their upper levels and the voltage at terminal 51T is at its lower level. Accordingly, the voltages at the terminals 51R and 51T all indicate digit values 0 in accordance with the assumed convention.

When the voltages applied to the terminals 51A and 51B are respectively at their lower and upper levels indicating digit values of 0, the transistor 60 is in a conductive condition so that its collector voltage is at an upper level. At this time the transistor 61 is in a nonconductive condition due to the effect of the upper level of voltage applied to its base from collector 60c through the resistor 78. As a result, the voltage at the collector 61c is at its lower level and the voltage at the terminal 51S is also at its lower level. The lower level of the voltage of collector 61c operates through resistor 82 to render the transistor 62 conductive even though the voltage at the point 100 is at its upper level at this time. As a result, the voltage at the collector 62c is at its upper level so that voltage at the terminal 51R is also at its upper level indicating a (0). The upper voltage level at collector 62c acts through resistor 87 to render the transistor 63 nonconductive and therefore the voltage at collector 63 is at its lower level whereby voltage at the terminal 51T is at its lower level indicating a (0). Consequently, the voltage levels respectively at the terminals 51R and 51T indicate digit values of 0 in the assigned convention.

When the voltages applied to the terminals 51A and 51B are at their upper levels which indicate respectively digit values of 1 and 0, the transistor 60 is nonconductive and the voltage at the collector 60c is at its lower level. The lower voltage level at collector 60c acts through resistor 78 to render transistor 61 conductive and as a result, the voltages at the collector 61c and at the terminal 51S are at their upper levels. This renders the transistor 62 nonconductive since junction 100 is also at a high level due to the voltage applied to terminal 51B, which results in voltages at the collector 62c and at the terminal 51R which are at their lower levels. The transistor 63 is therefore conductive and the voltages at the collector 63c and at the terminal 51T are at their upper levels. Accordingly, the voltage at the terminal 51S is at its upper level and the voltages at the terminals 51R and 51T are respectively at their lower and upper values and indicate digit values of 1.

Finally, when the voltages applied to the terminals 51A and 51B are both at their lower levels indicating digit values respectively of 0 and 1, the transistor 60 is in a conductive condition and the voltage at the collector 60c is therefore at its upper level. The lower level of voltage at terminal 51B overrides the upper level of the voltage at collector 60c so that the transistor 61 is in a conductive condition and therefore the voltages at the collector 61c and the terminal 51S are at their upper levels. The transistor 62 is therefore nonconductive and as a result voltages at the collector 62c and terminal 51R are at their lower levels. This renders transistor 63 conductive so that the voltage applied to terminal 51T is at its upper level. Accordingly, the same digit values result in this example as were realized in the previous example when the voltages applied to the terminals 51C and 51B were at their upper levels. The terminal 51C may be employed in place of the terminal 51A and the circuit will respond to bivalued signals applied thereto in the same manner as if applied to terminal 51A. Two terminals are provided to accommodate signals having different levels and the resistors connecting the terminals to the base of transistor 60 have magnitudes which enable the signals to render the transistor conductive and nonconductive in response to the different levels. The magnitude of resistor 65 may be adjusted, if necessary, to adjust the bias in the terminals.

The circuit is designed such that the base 61a of the transistor 61 is at a positive voltage only when the voltages at the terminals 51A and 51B are respectively at their lower and upper voltage levels. This arrangement provides a voltage at the terminal 51S which is at its lower level only for a lower voltage level at terminals 51A or 51C and an upper level at terminal 51B. Also, the circuit design is such that the base 62a of the transistor 62 is at a negative voltage when voltages at the terminals 51A and 51B are respectively at their lower and upper voltage levels even though the point 100 is at its upper voltage level at such time. Such negative voltage at the base 62a is derived from the collector 61c of transistor 61 which overrides the upper voltage level at the point 100.

It is noted that the transistor 60 functions as an inverter to provide upper and lower voltage levels at its collector when the lower and upper voltage levels respectively are applied to its base. In certain applications the transistor 60 may be omitted when an inversion is not necessary. Also, in certain applications the transistor 63 and the T terminal may be omitted. When this is done, the two voltages representative of the natural binary number digits both may be derived from the collector 62c of transistor 62.

When the above described circuit is employed as the circuit 53 the voltage levels appearing at the S terminal are used. It will be recalled that the circuits respond to voltages at the C terminals in the same manner as the voltages at the A terminals and that the voltage at the terminal 53S is applied to the terminal 57C of the digit comparator circuit 57 which is to effect a comparison of the natural binary number digits resulting from the circuits 52 and 53. Consequently, the voltages at the terminals 53S and 53T are to be indicative of the same digit value so that the digit represented by voltage applied to the terminal 57C from the terimnal 53S is the same as the digit represented by the voltage at the terminal 53T. The levels of the input voltages at the circuit 53 have only two combinations since the next most significant binary digit of the number of the fine encoder with which the gray digit of the coarsest zone of the fine encoder is to be compared is always (0) and, therefore, a high level voltage is always applied to the terminal 53B as in the case of circuit 51. From the description of the circuit 51, it will be recalled that with the higher level of the voltage applied to terminal 51B, the voltage level at terminals 51S and 51T will follow the level at terminal 51A and, therefore, when an upper level or (1) is applied to terminal 53A, an upper level or (1) appears at the terminals 53T and 57S and, conversely, when a lower level representing a (0) from the reader units is applied to the terminal 53A, a lower level representing a binary digit (0) appears at terminals 53T and 53S.

The natural binary digit appearing at the terminal 53T is to be compared with the natural binary digit appearing at the terminal 52T of the circuit 52 and, if the digit at the terimnal 52T is (1) and the digit at terminal 53S is (0), a (1) is to be added to the number represented by the more significant natural binary digits from the coarse encoder. Inasmuch as the voltage levels at the terminals 52T, 53S have high levels and low levels, respectively, for the digit values (1) and (0), the circuit 57 is to provide a signal which effects the adding of a (1) when the voltage level at terminal 52T is at its high level and the voltage level at terminal 53S is at its low level. The terminals 53S, 52T are, respectively, connected to the terminals 57C, 57B of the circuit 57 and it will be recalled from the description of the circuit 51 that, when a high level voltage is applied to a B terminal and a low level voltage is applied to a C terminal, the S terminal will have a low level; and the voltage at the S terminal will have a high level for all other voltage conditions of the C and B terminals. Consequently, when the terminal 57S is at a low level, a (1) is to be added to the number represented by the more significant digits of the coarse encoder since this indicates that the natural binary digit at the terminal 52T is (1) and the binary digit at terminal 53T is (0).

The terminal 57S of the circuit 57 is connected to the terminal 56C of the circuit 56 which is used as an adder circuit. Inasmuch as a (1) is to be added when the voltage at terminal 57S is at a low level, the low level of terminal 57S is designated as a (1) for the sake of convenience and this (1) is to be added to the natural binary digit appearing at the terminal 51T to provide a sum digit at the terminal 56T and a carry at the terminal 56S when the sum of the digits applied to the terminals 56C, 56B calls for a carry. It will be recalled from the description of circuit 51 that, when different voltage levels are applied to the B and C terminals, the voltage level at the T terminal is down, indicating a binary digit value of (0). Consequently, when the circuit 57 indicates that a (1) is to be added to the binary number from the coarse encoder the terminal 56C is down and the voltage level at terminal 56T will be down, indicating a sum digit (0), when the voltage level at 56B is up which occurs when the natural binary digit at terminal 51T is (1). When the terminal at 56B is at its lower level indicating a binary digit (0) at terminal 51T and the terminal 56C is at its lower level indicating the addition of a 1 both the terminals 56C and 56B are at their lower levels and the voltage at terminal 56T is at its high level indicating the binary sum digit value (1). This is appropriate, since the low level voltages to terimnals 56C, 56B are indicative of digit values (1) and (0), respectively, in accordance with the assigned convention and the sum of (1) and (1) is (0). Similarly, when the circuit 57 is indicating that (0) is to be added to the more significant digits of the number from the coarse encoder, the voltage level at terminal 56C is at its higher level, and the voltage at terminal 56T will be at its high level when the binary digit at terminal 51T is (1) and its low level when the binary digit at terminal 51T is (0), since the voltages applied to terminal 56B will be, respectively, high and low voltages. This is appropriate, since the sum of (0) and (0) is (0) and the voltage at terminal 56T is, therefore, to be (0) and the sum of (0) and (1) is a (1), so that the voltage at terminal 56T is to be at a high level when the natural binary digit has a value of (1) at the terminal 51T and (0) is added from circuit 57.

It will be recalled from the description of circuit 51 that the S terminal of the circuit has a low level only when the C terminal is at a low level and the B terminal is at its upper level. For the circuit 56, a low level at terminal 56C indicates a (1) which is to be added to the digit at terminal 56B, and a high level at terminal 56B indicates that the digit value being applied thereto is (1)

and under this condition, and only under this condition, is a carry to be derived from the circuit 56. But, as noted before, the terminal 56S will be at its low level only for this condition and, therefore, the terminal 56S is connected to the terminal C of the next circuit, not shown, to provide a carry which is added in the next adding circuit in the same manner in which the signal from the terminal 57S was added in the circuit 56. Consequently, it can be seen that the described circuitry effects an addition of a (1) to the natural binary number appearing at the terminals of 50T, 51T, etc., of the converter circuits connected to the reading units of the coarse encoder when the circuit 57 indicates that the digit at terminal 52T is (1) and the digit at terminal 53S is (0).

The assignments of digit values to upper and lower voltage levels at the various terminals for the circuits 50, 52 and 54 is the same as the assignments for the described circuit 51 inasmuch as the circuits 50, 51, 52 and 54 are employed to carry out only the digit converting function and do not effect special operations in the manner of the circuits 53, 56 and 57.

The voltages applied to the A terminals of the circuits 50–54 are derived from the reader units for the coarse and fine disks and as explained previously, these voltages are represented by curves having sloped portions during transition periods wherein division lines between transparent and opaque portions of the zones are passing by the mask slits. Accordingly, the voltages from the reader units do not change instantaneously between their two extreme levels and it has been observed that this may result in the derivation of false information from voltages at the S, R and T terminals of the circuits 50–54.

To illustrate this in connection with the circuit 51, the voltages at the terminals 51S and 51T attain their respective digit-indicating levels for different values of the input voltage at the terminal 51A corresponding to different points on the sloped portions of the curve representing the input voltage. For example, the voltage at the terminal 51B is of substantially rectangular waveform, and if such voltage is at its upper level when voltage at the terminal 51A is decreasing from its upper level to its lower level, the lower voltage level at the terminal 51S indicative of a certain digit value is attained at a point on the downwardly sloped portion of the input voltage curve which is lower than the point at which the lower voltage level at the terminal 51T is attained. Also, when voltage at the terminal 51A is increasing from its lower level to its upper level, the upper voltage level at terminal 51T is attained at a point on the upwardly sloped portion of the curve which is lower than the point at which the upper voltage level at terminal 51S is attained. As a result, a certain amount of rotation of the disk C is required after the voltage at one of the terminals 51S and 51T reaches its digit-indicating level before the voltage at the other one of the terminals attains its digit-indicating level, and ambiguous indications can be obtained from the circuits during such periods of transition when voltage at the terminal 51A is increasing or decreasing.

In the present invention means are provided to eliminate the possibility of such ambiguous indications by causing the voltages at the S, R and T terminals of each of the circuits 50–54 to attain their digit-indicating levels substantially simultaneously. For this purpose a plurality of decision elements are disposed to be responsive to the voltages resulting from the reader units associated with the circuits 50–54. Each decision element is designed to produce an output quantity which is transferred substantially instantaneously between two stable states when the voltage from the associated reader unit increases and decreases to predetermined different values. In the illustrated and described embodiment of the invention each decision element is disposed so that its output quantity is applied to the base 61*a* of the transistor 61 and also to the base 62*a* of the transistor 62 of the associated digit converting circuit.

Figure 5:
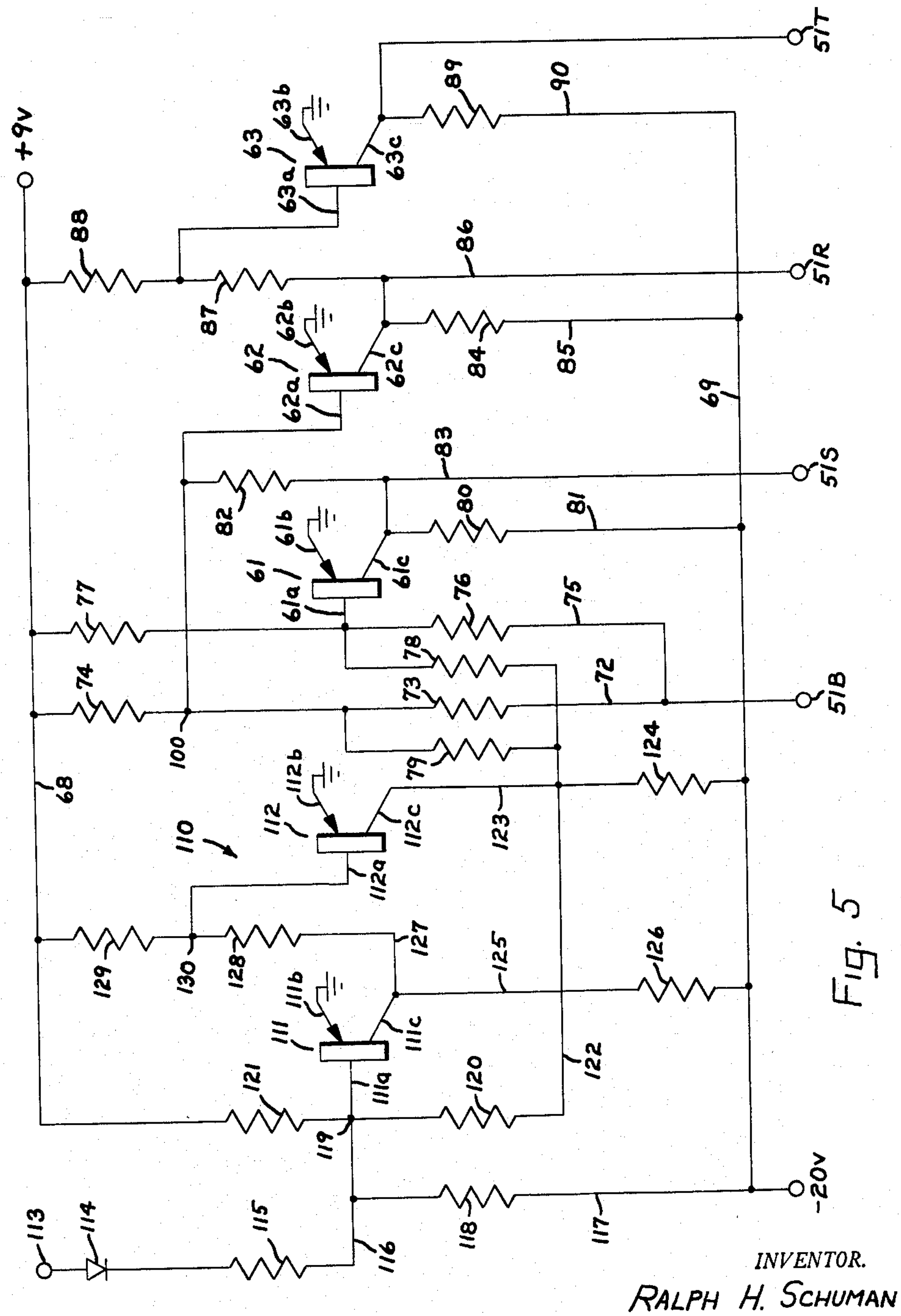
FIG. 5 is a circuit diagram different from that of FIG. 4, which may be employed for certain of the blocks of FIG. 3.

A decision element suitable for use in the present invention is shown and described in application Serial No. 78,571 filed December 27, 1960, and now Patent No. 3,217,314, by William J. Frank, and assigned to the assignee of the present invention. A decision element 110 of the type described in the aforementioned application is illustrated in detail in FIG. 5 as incorporated with the circuit 51. Corresponding parts of the circuit 51 in FIGS. 4 and 5 are designated by the same reference numeral. The decision element 110 includes an input transistor 111 and an output transistor 112 with the transistor 111 having a base 111*a*, an emitter 111*b* and a collector 111*c*, and with the transistor 112 including a base 112*a*, an emitter 112*b* and a collector 112*c*. Although the transistors 111 and 112 are illustrated in the form of PNP transistors, it is understood that transistors of the NPN type may be utilized if desired.

The voltage from the reader unit is applied to an input terminal 113 which corresponds to the A terminal of FIG. 4 and which is connected to the base 111*a* of the transistor 111 through a diode 114 and a resistor 115 included in a conductor 116. The conductor 116 is connected to a conductor 117 including a resistor 118 the lower terminal of which is connected to the conductor 69. The conductor 116 is connected to a point 119 intermediate resistors 120 and 121 included in a conductor 122. The upper terminal of the resistor 121 is connected to the conductor 68, and the lower terminal of the resistor 120 is connected to the lower terminals of the resistors 78 and 79 and to a conductor 123 which is connected to the collector 112*c* of the transistor 112. The conductor 123 includes a resistor 124 the lower terminal of which is connected to the conductor 69.

The collector 111*c* of the transistor 111 is connected to a conductor 125 including a resistor 126 the lower terminal of which is connected to conductor 69. Also connected to the collector 111*c* is a conductor 127 including resistors 128 and 129 with the upper terminal of resistor 129 connected to the conductor 68. The base 112*a* of the transistor 112 is connected to a point 130 intermediate the resistors 128 and 129. The emitters 111*b* and 112*b* of transistors 111 and 112 are connected to ground.

The circuit design is such that the transistor 111 is normally in a conducting condition and the transistor 112 is in a nonconducting condition when a zero voltage is applied to the terminal 113. When such voltage decreases from its zero value, the voltage at the point 119 increases to a positive value which operates to initiate termination of conduction of the transistor 111. When this occurs the voltage at the collector 111*c* is rendered sufficiently negative so that a negative voltage is applied to the base 112*a* of the transistor 112 through resistor 128 to initiate conduction of transistor 112. The voltage at the collector 112*c* of transistor 112 is thereby increased in a positive direction to its upper level. As soon as conduction of transistor 111 begins to decrease and conduction of transistor 112 is initiated, current is fed back through the resistor 120 and conductor 122 to the base 111*a* from the collector 112*c* so that the base 111*a* is rendered still more positive and the condition of transistor 111 is further reduced.

The above described action is cumulative and occurs at a very rapid rate so that the transistors 111 and 112 are rapidly rendered nonconductive and conductive respectively. It is thus seen that when voltage applied to the terminal 113 is reduced to a certain level, the output voltage at the collector 112*c* is rapidly transferred to its upper level.

The circuit is also arranged so that when voltage at the terminal 113 is increased to a certain level subsequent to the decrease just described, the transistors 111 and 112 are switched back to their normal conditions and voltage at the collector 112*c* is rapidly transferred from its upper level back to its lower level. The values of voltage applied to the terminal 113 at which the voltage at collector 112c is transferred between its two extreme levels are different so that a differential of voltage exists between the values effective to cause the transfers.

The output voltage of the decision element 110 is derived from the collector 112c and has a substantially rectangular waveform. This voltage is applied to the base 61a of transistor 61 through resistor 78 and also to the point 100 of the circuit through resistor 79. It is noted that the transistor 112 functions in a manner similar to transistor 60 of FIG. 4 since the voltage at the positive end of resistor 124 will be high and low, respectively, when the voltage at terminal 113 is high and low, respectively. When voltage applied to the terminal 113 is increased or decreased to a certain value, the voltage at collector 112c is transferred to one of its upper or lower levels, and it is observed that the voltages at the terminals 51R, 51S and 51T attain their digit indicating levels at substantially the same time.

When voltage at the terminal 113 is decreased to a certain level while voltage at the terminal 51B is at its upper level, the voltage at collector 112c is transferred to its upper level so that voltages at the point 100 and at the base 61a are simultaneously raised to their upper levels. This causes the voltages at the terminals 51R, 51S and 51T to attain respectively lower, upper and lower levels at substantially the same time. When voltage at the terminal 113 is subsequently increased to a certain level, voltage at the collector 112c is transferred to it slower level whereby voltages at the point 100 and at the base 61a are simultaneously at their upper and lower levels respectively. This results in the voltages at the terminals 51R, 51S and 51T simultaneously reaching respectively upper, lower and upper levels. The voltage at the collector 112c is preferably transferred before any of the output voltages attain their digit-indicating levels.

Because of the stage provided by transistor 111, the complement of the signal applied to the terminal 113 appears at the base 112a, corresponding to the base of transistor 60 of FIG. 4. Consequently, if the circuit of FIG. 5 is to respond to high and low signals from the reading units in the same manner as the circuit of FIG. 1, the output of the reading units should be complemented.

Although the invention has been described with reference to certain specific embodiments thereof, numerous modifications are possible and it is desired to cover all modifications falling within the spirit and scope of the appended claims.

What I claim is:

1. In an electrical system, a pair of terminals to be energized in accordance with input voltages each having upper and lower levels indicative of two digit values, said terminals having applied thereto at any given time one of four combinations of input voltage levels, a first electroresponsive valve having a first control electrode and a pair of first main electrodes, said first control electrode being connected for energization in accordance with voltage applied to one of said terminals, a second electroresponsive valve having a second control electrode and a pair of second main electrodes, circuit means connecting said second control electrode to one of said first main electrodes and to the other of said terminals, said circuit means being arranged to apply to said second control electrode a first control voltage having a first level for one combination of said input voltage levels and having a second level for the other three combinations of said input voltage levels, a first output terminal connected to one of said second main electrodes having applied thereto a first output voltage having one level for said one combination of the input voltage levels and having another level for said other three combinations of the input voltage levels, a third electroresponsive valve having a third control electrode and a pair of third main electrodes, additional circuit means connecting said third control electrode to one of said first main electrodes to one of said second main electrodes, and to said other terminal, said additional circuit means being arranged to apply to said third control electrode a second control voltage having a first level for one pair of combinations of said input voltage levels and having a second level for the other pair of combinations of the input voltage levels, a second output terminal connected to one of said third main electrodes and having applied thereto a second output voltage having a first level for one pair of combinations of the input voltage levels and having a second level for the other pair of combinations of said input voltage levels, and means for applying energizing potentials to each of said circuit means and said first, second and third valves.

2. A system as defined in claim 1 wherein said first output voltage has a lower level only for the combination of input voltage levels wherein said one terminal has a lower voltage level applied thereto and said other terminal has an upper voltage level applied thereto, said second output voltage having a lower level for the two combinations of input voltage levels wherein said terminals have corresponding input voltage levels applied thereto.

3. In an electrical system, a pair of terminals to be energized in accordance with input voltages each having upper and lower levels indicative of different digit values, said terminals having applied thereto at any given time one of four combinations of input voltage levels, first circuit means connected for energization in accordance with voltages at said terminals to produce a first output voltage having a first level for one combination of said input voltage levels and having a second level for the other three combinations of said input voltage levels, second circuit means connected for energization in accordance with said input voltages and in accordance with said first output voltage to produce a second output voltage having a first level for one pair of combinations of said input voltage levels, and having a second level for the other pair of combinations of said input voltage levels, and means for applying energizing potentials to said first and second circuit means, said first circuit means comprising a semiconductor device whose conductivity is determined by and follows the existing voltages on said input terminals, said semi-conductor device having conductive and nonconductive conditions and having one of said conditions for said one combination of input voltage levels and the other condition for the said other three combinations of input voltage levels, said second circuit means comprising a semiconductor device connected to said second input terminal and to the output circuit of the first mentioned semiconductor device and having conductive and nonconductive conditions in response to the voltage levels on said second terminal and in said output circuit.

4. In an electrical system, a pair of terminals to be energized in accordance with input voltages each having upper and lower levels indicative of different digit values, said terminals having applied thereto at any given time one of four combinations of input voltage levels, the input voltage applied to one of said terminals requiring a finite interval of time to vary between its upper and lower levels, a decision element connected for energization in accordance with the input voltage applied to said one of said terminals, said decision element being designed to produce an output quantity which is transferred substantially instantaneously between two values when the input voltage applied to said one of said terminals increases and decreases to selected values between its upper and lower levels, first circuit means connected for energization in accordance with said output quantity and in accordance with voltage at the other of said terminals to produce a first output voltage having a first level for one combination of said input voltage levels and having a second level for the other three combinations of said input voltage levels, second circuit means connected for energization in accordance with said output quantity, the voltage at said other of said terminals and said first output voltage to produce a second output voltage having a first level for one pair of combinations of said input voltage levels and having a second level for the other pair of combinations of said input voltage levels, and means for applying energizing potentials to said decision element and said first and second circuit means, said first and second output voltages attaining their digit-indicating levels for different values of the input voltage applied to said one of said terminals between its upper and lower levels, said decision element being designed so that transfers of its output quantity cause said first and second output voltages to attain their digit-indicating levels simultaneously.

5. A system as defined in claim 4 wherein said first circuit means includes a first transistor having first base, emitter and collector electrodes with the first base connected for energization in accordance with said output quantity and in accordance with voltage at the other of said terminals, said second circuit means including a second transistor having second base, emitter and collector electrodes with the second base connected for energization in accordance with voltage at said first collector, said output quantity, and voltage at said other of said terminals.

6. In an analogue to digital converter device, fine and coarse code disks geared for rotation at different speeds in accordance with rotation of a shaft, each disk having a code in reflected binary form inscribed thereon and including a plurality of concentric digit-representing zones each having alternate transparent and opaque portions indicative of values of the represented digits, a plurality of readers for reading the zones of each disk, each of said readers producing a voltage having different levels representative of values of the digit represented by the associated zone, and a decoding system for converting reflected binary numbers indicated by the reader voltages to the equivalent natural binary numbers, said decoding system including a plurality of coarse disk digit converting circuits and a plurality of fine disk digit converting circuits, each circuit having first and second input terminals with the first terminals each connected for energization in accordance with voltage from a separate reader, each of said circuits having a pair of output terminals at which appear output voltages representative of the natural binary number digit equivalent to the reflected binary number digit represented by voltage applied to the first terminal of the circuit, the digit converting circuits for each disk being interconnected with one of the output terminals of one circuit connected to the second terminal of the following circuit such that each circuit for a disk is energized by two voltages representative respectively of a reflected binary number digit and the equivalent natural binary number digit in the next higher digit place.

7. A device as defined in claim 6 wherein each of the two circuits for the two disks which are responsive to reader voltages representative of reflected binary number digits in the highest digit places includes a natural binary number digit input terminal connected to ground.

8. In an analogue to digital converter device, fine and coarse code disks geared for rotation at different speeds in accordance with rotation of a shaft, each disk having a code in reflected binary form inscribed thereon and including a plurality of concentric digit-representing zones each having alternate transparent and opaque portions indicative of values of the represented digits, a plurality of readers for reading the zones of each disk, each of said readers producing a voltage having different levels representative of values of the digit represented by the associated zone, and a decoding system for converting reflected binary numbers indicated by the reader voltages to the equivalent natural binary numbers, and for compensating the equivalent natural binary numbers for gear backlash, said decoding system including a plurality of coarse disk digit converting circuits and a plurality of fine disk digit converting circuits, each circuit having first and second input terminals with the first terminals each connected for energization in accordance with voltage from a separate reader, each of said circuits having a pair of output terminals at which appear output voltages representative of the natural binary number digit equivalent to the reflected binary number digit represented by voltage applied to the first terminal of the circuit, the digit converting circuits for each disk being interconnected with one of the output terminals of one circuit connected to the second terminal of the following circuit such that each circuit for a disk is energized by two voltages representative respectively of a reflected binary number digit and the equivalent natural binary number digit in the next higher digit place, a digit comparator circuit connected for energization in accordance with output voltages representative of the equivalent natural binary number digits resulting from the digit converting circuits for the coarse zone of the fine disk and the fine zone of the coarse disk, said digit comparator circuit including an output terminal at which appears a voltage indicative of a 1 only when the equivalent natural binary number digits resulting from the fine zone of the coarse disk and the coarse zone of the fine disk have values respectively 1 and 0, and a plurality of interconnected digit adding circuits responsive to output voltages from the digit converting circuits for zones of the coarse disk except the finest zone and responsive to the output voltage from the digit comparator circuit to add a 1 to the equivalent natural binary number digit resulting from the next to finest zone of the coarse disk, each of said adding circuits including an output terminal to which is applied an output voltage representative of a compensated equivalent natural binary number digit.

9. A device as defined in claim 8 including translating means connected for energization in accordance with output voltages from the adding circuits and output voltages from the digit converting circuits for zones of the fine disk.

10. A device as defined in claim 8 wherein one of said digit adding circuits includes a pair of input terminals and a pair of output terminals, the input terminals of said one adding circuit being connected to an output terminal of the digit converting circuit for the next to finest zone of the coarse disk and to the output terminal of the digit comparator circuit, the output terminals of said one adding circuit having applied thereto respectively voltages representative of a carry or no carry from the adding operation and of a compensated equivalent natural binary number digit in the lowest digit place, another of said digit adding circuits including a pair of input terminals and an output terminal, the input terminals of said another adding circuit being connected to an output terminal of the digit converting circuit for the coarsest zone of the coarse disk and to the carry voltage output terminal of the preceding adding circuit, the output terminal of said another circuit having applied thereto a voltage representative of a compensated equivalent natural binary number digit in the highest digit place.

11. A device as defined in claim 8 wherein said readers produce voltages which require a certain amount of disk rotation to vary between said two levels, the output voltages of each circuit attaining their digit-indicating levels at different values of the reader voltage between the two levels of such voltage, each of said circuits including a decision element connected for energization in accordance with a reader voltage to produce an output quantity which is transferred substantially instantaneously between two values when the reader voltage applied thereto increases and decreases to selected values between its two levels for causing the two output voltages to simultaneously attain their digit-indicating levels.

12. In an analogue to digital converter device, fine and coarse code disks geared for rotation at different speeds in accordance with rotation of a shaft, each disk having a code in reflected binary form inscribed thereon and including a plurality of concentric digit-representing zones each having alternate transparent and opaque portions indicative of values of the represented digits, a plurality of readers for reading the zones of each disk, each of said readers producing a voltage having different levels representative of values of the digit represented by the associated zone, and a decoding system for converting reflected binary numbers indicated by the reader voltages to the equivalent natural binary numbers, and for compensating the equivalent natural binary numbers for gear backlash, said decoding system including a plurality of coarse disk digit converting circuits and a plurality of fine disk digit converting circuits, each circuit having first and second input terminals with the first terminals each connected for energization in accordance with voltage from a separate reader, each of said circuits having a pair of output terminals at which appear output voltages representative of the natural binary number digit equivalent to the reflected binary number digit represented by voltage applied to the first terminal of the circuit, the digit converting circuits for each disk being interconnected with one of the output terminals of one circuit connected to the second terminal of the following circuit such that each circuit for a disk is energized by two voltages representative respectively of a reflected binary number digit and the equivalent natural binary number digit in the next higher digit place, a digit comparator circuit connected for energization in accordance with output voltages representative of the equivalent natural binary number digits resulting from the digit converting circuits for the coarse zone of the fine disk and the fine zone of the coarse disk, said digit comparator circuit including an output terminal at which appears a voltage indicative of a 1 only when the equivalent natural binary number digits resulting from the fine zone of the coarse disk and the coarse zone of the fine disk have values respectively 1 and 0, and a plurality of interconnected digit adding circuits responsive to output voltages from the digit converting circuits for zones of the coarse disk except the finest zone and responsive to the output voltage from the digit comparator circuit to add a 1 to the equivalent natural binary number digit resulting from the next to finest zone of the coarse disk, each of said adding circuits including an output terminal to which is applied an output voltage representative of a compensated equivalent natural binary number digit, each of said digit converting circuits, digit adding circuits and said comparator circuit being identical and each comprising first input terminal means, second input terminal means, a first electroresponsive valve having a first control electrode and a pair of main electrodes, said first control electrode being connected to said first input terminal means for energization in accordance with the voltage applied thereto, a second electroresponsive valve having a second control electrode and a second pair of main electrodes, circuit means connecting said second control electrode to one of said first main electrodes and to said second input terminal means, the voltage to said one of said main electrodes having upper and lower voltage levels corresponding to different ones of the upper and lower input voltages applied to said first terminal means and said second circuit means being connected to apply a control voltage to said second electroresponsive valve to render the latter conductive only when the voltage levels at said one main electrode and at said second terminal means are both at a particular one of their different levels, a first output terminal means connected to said second main electrode and having one level when said electroresponsive valve is conductive and a different level when said valve is nonconductive, second output terminal means, a third electroresponsive valve having a control electrode and main electrodes, circuit means connecting said control electrode of said third electroresponsive valve to said first output terminal means and to said second input terminal means and rendering said third valve conductive when both of the voltages at said first and second input terminal means are at a particular one of their different levels whereby the voltage at said second output terminal means is at one level when said third electroresponsive valve is conductive and at a different level when nonconductive, third output terminal means, and circuit means connected to said third electroresponsive valve and said third output terminal means to provide a complement of the voltage level at said second output terminal means, said first and second input terminal means providing said input terminals of said decoding circuits and said pair of input terminals for the adding circuits with said second input terminal means being connected to the decoding circuits and said second and third output terminal means providing said pair of output terminals for said decoding circuits and said first and third output terminal means providing said pair of output terminals for the digit adding circuits and said first output terminal means constituting the output terminal for said digital comparator.

13. In an analogue to digital converter device, information means having a code inscribed thereon in reflected binary form and movable in accordance with movement of a device the analogue of which is to be converted, reading means for reading digits of the code inscribed on the information means, said reading means producing a plurality of digit representing voltages having levels indicative of values of the represented digits, and decoding means for converting reflected binary numbers indicated by voltages from said reading means to the equivalent natural binary numbers, said decoding means including a plurality of digit converting circuits each having first and second input terminals with each first terminal connected for energization in accordance with a separate voltage from the reading means representative of a reflected binary number digit, each of said circuits being designed to produce when energized a pair of output voltages each representative of the natural binary number digit equivalent to the reflected binary number digit represented by voltage applied to the first terminal, said circuits being interconnected such that one of the output voltages representative of a natural binary number digit derived from one circuit is applied to the second terminal of the following circuit to the first terminal of which is applied a voltage representative of the reflected binary number digit in the next lower digit place, said reading means producing voltages which require a certain amount of movement of the information means to vary between two levels, the output voltages of each circuit attaining their digit indicating levels at different values of the reading voltage between the two levels of such voltage, each of said circuits including a decision element connected for energization in accordance with a reading voltage to produce an output quantity which is transferred substantially instantaneously between two values when the reading voltage applied thereto increases and decreases to selected values between its two levels for causing the two output voltages to attain their digit indicating levels simultaneously.

14. In an analogue to digital converter device, fine and coarse code disks geared for rotation at different speeds in accordance with rotation of a shaft, each disk having a code in reflected binary form inscribed thereon and including a plurality of concentric digit-representing zones each having alternate transparent and opaque portions indicative of values of the represented digits, a plurality of readers for reading the zones of each disk, each of said readers producing a voltage having different levels representative of values of the digit represented by the associated zone, a decoding system for converting reflected binary numbers indicated by the reader voltages to the equivalent natural binary numbers, said decoding system including a plurality of coarse disk digit converting circuits and a plurality of fine disk digit converting circuits, each circuit having first and second input terminals with the first terminals each connected for energization in accordance with voltage from a separate reader, each of said circuits having a pair of output terminals at which appear output voltages representative of the natural binary number digit equivalent to the reflected binary number digit represented by voltage applied to the first terminal of the circuit, the digit converting circuits for each disk being interconnected with one of the output terminals of one circuit connected to the second terminal of the following circuit such that each circuit for a disk is energized by two voltages representative respectively of a reflected binary number digit and the equivalent natural binary number digit in the next higher digit place, a plurality of additional circuits connected to certain of said digit converting circuits for compensating the equivalent natural binary number resulting from the coarse disk for gear backlash.

15. In an analogue to digital converter device, fine and coarse code disks geared for rotation at different speeds in accordance with rotation of a shaft, each disk having a code in reflected binary form inscribed thereon and including a plurality of concentric digit-representing zones each having alternate transparent and opaque portions indicative of values of the represented digits, a plurality of readers for reading the zones of each disk, each of said readers producing a voltage having different levels representative of values of the digit represented by the associated zone, a decoding system for converting reflected binary numbers indicated by the reader voltages to the equivalent natural binary numbers, said decoding system including a plurality of coarse disk digit converting circuits and a plurality of fine disk digit converting circuits, each circuit having first and second input terminals with the first terminals each connected for energization in accordance with voltage from a separate reader, each of said circuits having a pair of output terminals at which appear output voltages representative of the natural binary number digit equivalent to the reflected binary number digit represented by voltage applied to the first terminal of the circuit, the digit converting circuits for each disk being interconnected with one of the output terminals of one circuit connected to the second terminal of the following circuit such that each circuit for a disk is energized by two voltages representative respectively of a reflected binary number digit and the equivalent natural binary number digit in the next higher digit place, the digit converting circuit for the coarse zone of the fine disk including first circuit means connected for energization in accordance with voltages at said input levels to produce an additional output voltage having a first level for one combination of said input voltage levels and a second level for the other three combinations of said input voltage levels, said second circuit means connected for energization in accordance with said input voltages and in accordance with said additional output voltage to produce at said pair of output terminals output voltages each having a first level for one pair of combinations of said input voltage levels and a second level for the other pair of combinations of said input voltage levels, and means for applying energizing potentials to said first and second circuit means.

16. In an analogue to digital converter device, fine and coarse code disks geared for rotation at different speeds in accordance with rotation of a shaft, each disk having a code in reflected binary form inscribed thereon and including a plurality of concentric digit-representing zones each having alternate transparent and opaque portions indicative of values of the represented digits, a plurality of readers for reading the zones of each disk, each of said readers producing a voltage having different levels representative of values of the digit represented by the associated zone, a decoding system for converting reflected binary numbers indicated by the reader voltages to the equivalent natural binary numbers, said decoding system including a plurality of coarse disk digit converting circuits and a plurality of fine disk digit converting circuits, each circuit having first and second input terminals with the first terminals each connected for energization in accordance with voltage from a separate reader, each of said circuits having a pair of output terminals at which appear output voltages representative of the natural binary number digit equivalent to the reflected binary number digit represented by voltage applied to the first terminal of the circuit, the digit converting circuits for each disk being interconnected with one of the output terminals of one circuit connected to the second terminal of the following circuit such that each circuit for a disk is energized by two voltages representative respectively of a reflected binary number digit and the equivalent natural binary number digit in the next higher digit place, said readers producing voltages which require a certain amount of disk rotation to vary between said two levels, the output voltages of the circuit attaining their digit indicating levels at different values of the reader voltage between the two levels of such voltage, each of said circuits including a decision element connected for energization in accordance with a reader voltage to produce an output quantity which is transferred substantially instantaneously between two values when the reader voltage applied thereto increases and decreases to selected values between its two levels for causing the two output voltages to simultaneously attain their digit indicating levels.

17. An electrical circuit for use in an electrical system where a reflected binary number is to be converted to a natural number and wherein an addition of one is to be made to the natural binary number, a first terminal to which a reflected binary digit is to be applied, a second terminal to which natural binary number from the next higher order is to be applied, a first electro-responsive valve having an input circuit energized in accordance with the existing voltages on said input terminals and a first output circuit, said valve having one conductive condition for a unique combination of voltages on said input terminals and a different conductive condition for the other combinations of voltages on said input terminals, a second electro-responsive valve circuit having an input circuit connected to said second input terminal and to said output circuit whereby said second electro-responsive valve has a conductive condition dependent upon the relative magnitudes of existing voltages in said output circuit and on said second input terminal, said second electro-responsive valve having a second output circuit having one condition of energization for two different combinations of voltages in said first output circuit and on said second terminal and a second conductive condition for the other two combinations of voltages on said second input terminal and in said first output circuit, and output terminal means connected to said second output circuit and having a voltage thereon representing the converted reflected binary digit when the reflected binary digit is applied to said first input terminal and a voltage representing the digit value of the natural binary digit of the next higher order is applied to said second input terminal.

18. An electrical system comprising a plurality of electrical circuits as defined in claim 17, wherein each of said electrical circuits comprises an additional input terminal and said first electro-responsive valve is responsive to the sum of the voltage on said first and additional input terminals, and said electrical circuit has two output terminals connected to said second output circuit and representing the converted reflected binary digit and a first plurality of said circuits have the digits of the reflected binary number to be converted applied to the first input terminals thereof and one of said output terminals connected to the second terminal of the next lower reflected binary digit and a second set of said plurality of circuits being arranged in an adder configuration to add a 1 to the natural binary digits appearing at said first output terminal means of the first plurality of said circuits, each of said electrical circuits of said adder configuration having a first input terminal connected to the output terminal means of a corresponding one of said circuits in said converting configuration, said additional terminal of each of said circuits of the adder configuration being connected to the first output circuit of the first electro-responsive valve of the circuit means of the adder configuration for the next lesser significant digit and said output terminal means.

19. An electrical circuit for use in electrical system where a reflected binary number is to be converted to a natural member and wherein an addition of one is to be made to the natural binary member, a first terminal to which a reflected binary digit is to be applied, a second terminal to which natural binary number from the next higher order is to be applied, a first semi-conductor device having a conductive condition determined by the existing voltages on said input terminals and a first output circuit energized in accordance with the conductive condition of said device, said semi-conductor device having one conductive condition for a unique combination of voltages on said input terminals and a different conductive condition for the other combinations of voltages on said input terminals, a first output circuit for said device having first and second voltage conditions for the conductive and non-conductive conditions respectively of said device, a second semi-conductor device controlled by the existing voltages on said second input terminal and in said output circuit whereby said second semi-conductor device has a conductive condition dependent upon the relative magnitudes of the existing voltages in said first output circuit and on said second input terminal, said second semi-conductor devices effecting the energization of a second output circuit and having one condition of energization for two different combinations of voltages in said first output circuit and on said second terminal and a second conductive condition for the other two combinations of voltages on said second input terminal and in said first output circuit, and output terminal means connected to said second output circuit and having a voltage thereon representing the converted reflected binary digit when the binary digit is applied to said first input terminal and voltages representing the digit value of the natural binary digit of the next higher order is applied to said second input terminal.

20. An electrical system, a plurality of electrical circuits as defined in claim 19, wherein each of said electrical circuits comprises an additional input terminal whereby the voltage on said first input terminal and said additional terminal are combined additively, and each of said electrical circuits has two output terminals connected to said second output circuit and representing the converted reflected binary digit, a first plurality of said electrical circuits being connected into a converting configuration and having the digits representing the binary number in reflected form to be converted applied to the first input terminals thereof with each of the electrical circuits having one of its said output terminals connected to the said second terminal of the electrical circuit for the next lower reflected binary digit, and a second set of said plurality of electrical circuits being arranged in an adder configuration to add a one to the natural binary member appearing at said first output terminal means of the electrical circuits in the converting configuration, each of said electrical circuits of said adder configuration having its first input terminal connected to the output terminal means of a corresponding one of said electrical circuits in said converting configuration and its additional terminal connected to the output circuit of said first electro-responsive valve of the electrical circuit in the adder configuration for the next lesser significant digit.

21. A digit converting electrical circuit for use in converting binary digits from one code to another, first and second input terminals to each of which a voltage having two possible levels representing the value of a respective digit is to be applied, a first semi-conductor device responsive to the existing voltage levels on said terminals and having a first condition for three combinations of the digit values on said terminals and a second condition for the fourth combination of said digit values, one of said conditions being conductive and the other non-conductive, a first output circuit controlled by said semi-conductor device and having respective voltage conditions corresponding to said first and second conditions of said device, a second semi-conductor device responsive to the existing voltage levels on said second input terminal and in said first output circuit and having a conductive condition for two combinations of voltages on said second input terminal and in said first output circuit and a non-conductive condition for the other two combinations of the voltage levels on said second input terminal and in said output circuit, a second output circuit for said second semi-conductor device having first and second voltage levels therein for said conductive and non-conductive conditions respectively of said second semi-conductor device.

22. A digit converting electrical circuit for use in converting binary digits from one code to another, first and second input terminals to each of which a voltage having two possible levels representing the value of a respective digit is to be applied, a first semi-conductor device responsive to the existing voltage levels on said terminals and having a first condition for three combinations of the digit values on said terminals and a second condition for the fourth combination of said digit values, one of said conditions being conductive and the other non-conductive, a first output circuit controlled by said semi-conductor device and having respective voltage conditions corresponding to said first and second conditions of said device, a second semi-conductor device responsive to the existing voltage levels on said second input terminal and in said first output circuit and having a conductive condition for two combinations of voltages on said second input terminal and in said first output circuit and a non-conductive condition for the other two combinations of the voltage levels on said second input terminal and in said output circuit, a second output circuit for said second semi-conductor device having first and second voltage levels therein for said conductive and non-conductive conditions respectively of said second semi-conductor device, respective output terminal means connected to said first and second output circuits, and an additional input terminal connected to said first input terminal whereby the voltages thereon are combined additively.

23. In an analogue to digital converting system, a rotatable member, fine and coarse zone disks driven from said member at different speeds, each disk having a code in reflected binary code thereon and including a plurality of digit representing zones each having alternate portions respectively indicative of one value of the represented digits whose values are arbitrarily designated as 1 and 0, a plurality of readers for reading zones of each disk, first circuit means responsive to the readers for establishing electrical representations of the natural binary digits corresponding to the zones on the code disk, a comparator circuit for comparing the natural binary digit corresponding to the fine zone of the coarse disk and the coarse zone of the fine disk and providing an output voltage representing a 1 when the fine zone of the coarse disk has a value of 1 and the coarse zone of the fine disk has a value of 0 and adder circuit means having digit input terminals for the augend connected to said first circuit means whereby the binary digits from the zones of more significance than the fine zone of the coarse disk constitute the augend and an input terminal for the addend connected to the output of said comparator.

References Cited by the Examiner

UNITED STATES PATENTS

| | | | |
|---|---|---|---|
| 2,758,788 | 8/1956 | Yaeger | 340—347 |
| 2,779,539 | 1/1957 | Darlington | 235—154 |
| 2,793,807 | 5/1957 | Yaeger | 340—347 |

(Other references on following page)

UNITED STATES PATENTS

| | | | |
|---|---|---|---|
| 2,858,530 | 10/1958 | Kohns | 340—347 |
| 2,876,444 | 3/1959 | Moss | 340—347 |
| 2,954,165 | 9/1960 | Myers | 235—154 |
| 2,986,726 | 5/1961 | Jones | 340—347 |
| 3,019,351 | 1/1962 | Pomerene et al. | 307—88.5 |
| 3,030,617 | 4/1962 | Chase | 340—347 |
| 3,038,091 | 6/1962 | Clapper | 307—88.5 |

DARYL W. COOK, *Acting Primary Examiner.*

MALCOLM A. MORRISON, *Examiner.*

D. M. ROSEN, J. F. MILLER, *Assistant Examiners.*